July 14, 1925.
D. R. SCHOLES
WINDMILL
Filed June 16, 1924
1,545,611
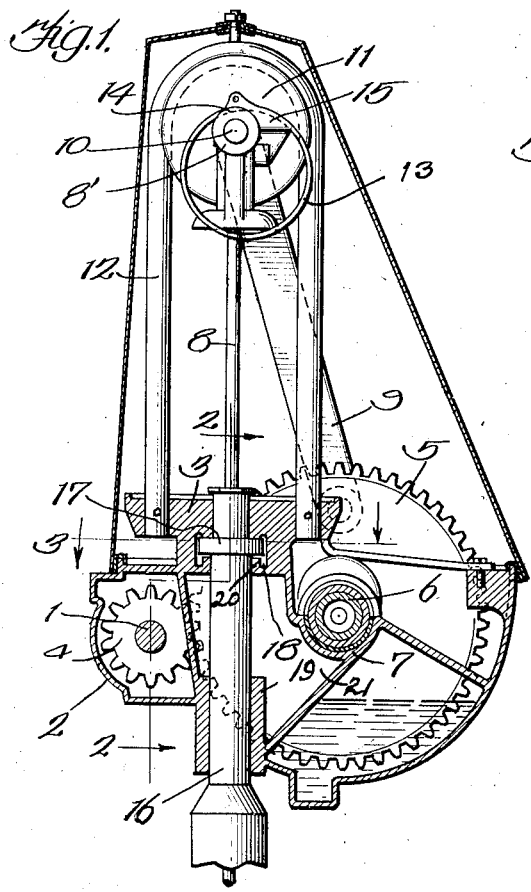
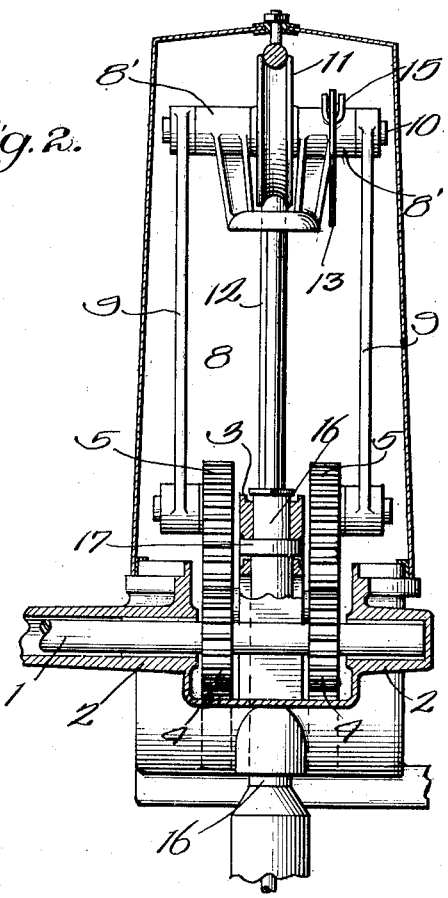
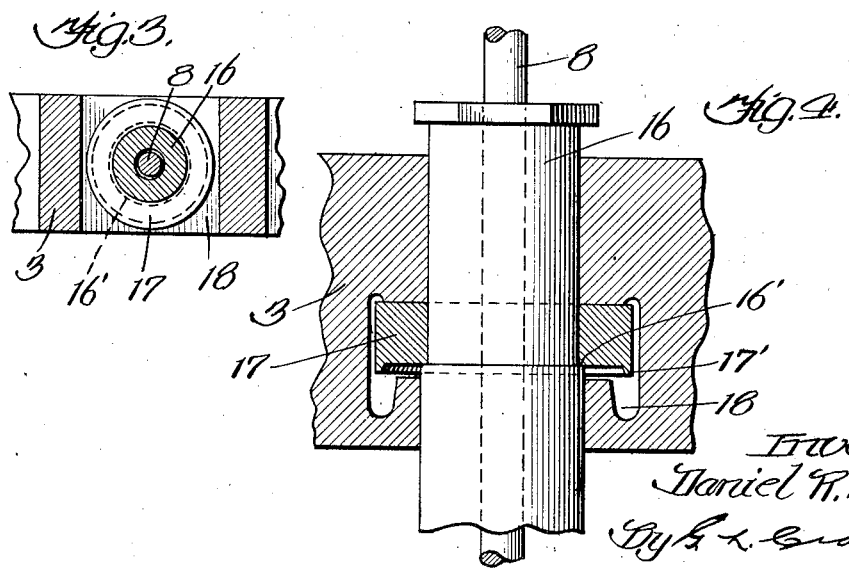
Inventor:
Daniel R. Scholes Patented July 14, 1925.

1,545,611

UNITED STATES PATENT OFFICE.

DANIEL R. SCHOLES, OF CHICAGO, ILLINOIS, ASSIGNOR TO AEROMETER COMPANY, OF CHICAGO, ILLINOIS, A CORPORATION OF ILLINOIS.

WINDMILL.

Application filed June 16, 1924. Serial No. 720,228.

*To all whom it may concern:*

Be it known that I, DANIEL R. SCHOLES, a citizen of the United States, residing at Chicago, in the county of Cook and the State of Illinois, have invented a certain new and useful Improvement in Windmills, of which the following is a full, clear, concise, and exact description.

My invention relates to windmills employing heads that are formed with basins for receiving lubricant which is supplied to working parts. The step bearings upon which the mill heads are rotatively supported have not, hitherto, been lubricated, these bearings having been so located as to be inaccessible to the lubricant supplied to other parts from the lubricant basins. My invention resides in a windmill construction whereby lubricant may be supplied to the step bearings from the basins in the mill heads, provision also being preferably made for the return to the basins of the lubricant supplied to said step bearings. In carrying out my invention, I preferably elevate the step bearings from its prior position below the mill head to a place above the bottom of the basin so that lubricant may be readily supplied to the bearing from the basin and, preferably, returned to the basin.

The invention will be more fully explained in connection with the accompanying drawing in which Fig. 1 is a vertical sectional view of the upper portion of a windmill as I preferably construct it; Fig. 2 is a sectional view on line 2—2 of Fig. 1; Fig. 3 is a sectional view on line 3—3 of Fig. 1; and Fig. 4 is an enlargement of a portion of Fig. 1.

The horizontal wind wheel shaft 1 is journaled in bearings 2 that are carried by the mill head 3. Two spur pinions 4 are fixed upon the shaft and in mesh with spur gear wheels 5. These gear wheels are carried by a shaft 6 that is journaled in bearings 7 carried by the mill head. Power is transmitted from the wind wheel shaft through the gearing 4, 5 to the pump rod 8 or other load operating element through the intermediation of pitmen 9. These pitmen connect the gear wheels 5 with the shaft 10 that carries a grooved wheel 11. The upright sides of a stirrup 10 are received in the groove of the wheel 11 to confine the upper ends of the pitmen and load shaft and the parts assembled therewith at the upper end of the load shaft to vertical movement. A creeping ring 13 surrounds the shaft 8 and the bearings 8′ for this shaft that are carried upon the upper end of shaft 8. The upper portion of one of the bearings is hollowed as indicated at 14 and has a lateral grooved continuation 15, the creeping ring being received in the groove of this continuation and moving above the hollow 14 whereby oil which is supplied to the creeping ring, as hereinafter specified, finds entry to the bearings containing the shaft 10 and is passed to other working parts of the mill. As illustrated, the creeping ring is supplied with oil by contacting with one of the spur gears 5 that is in the same vertical plane therewith, the creeping ring contacting with this spur gear and consequently turning slightly when the pump rod 8 is nearing the lower end of its stroke. As a result of the engagement of the ring with this spur gear, a portion of the oil which is carried up by the gear from the oil basin, is transferred to the ring and is elevated by the ring in position to be fed to the bearings 8′ and other parts. A portion of the oil will find its way through the mill head 3 where this mill head is penetrated by the upright shaft 16 and is supported upon a step bearing 17 whereby this step bearing is lubricated. In the preferred embodiment of the invention, the step bearing is in the form of a collar placed upon the shaft to constitute a flange, the shaft being preferably formed with a shoulder 16′ upon which the collar is bottomed. This collar and the part of the mill head turning thereon, are above the bottom of the basin so that the oil supplied to the step bearing through the agency of the creeping ring 13 will be returned to the basin. In the preferred embodiment of the invention, oil passages 18 are provided in the part of the mill head below the flange 17, these passages guiding the oil from the step hearing back to the oil basin. The bottom of the collar is formed with a depending annular lip 17′ which overlies the passages 18 to facilitate the return of the oil. The shaft 16 is preferably tubular to enable the pump rod 8 or other load actuating element to be passed therethrough.

As illustrated, the shaft 16 passes upwardly through the sleeve continuation 19 of the basin bottom and a sleeve continuation 20 of the basin, these sleeve continuations being parts of the mill head. The sleeves are preferably separated, the shaft 16 passing through a compartment 21 of the mill head that is preferably out of communication with the basin. The construction of my invention prevents the oil from passing to this compartment and to the interiors of the sleeves from the step bearing and returns it to the basins.

Changes may be made without departing from my invention.

Having thus described my invention, I claim:

1. A windmill including the head thereof which is provided with a lubricant receiving basin; an upright shaft provided with a step bearing upon which the head is rotatively supported; and lubricant conveying means discharging lubricant from said basin upon said bearing, there being means for returning lubricant from said bearing to said basin.

2. A windmill including the head thereof which is provided with a lubricant receiving basin; an upright shaft provided with a step bearing above and overlying the bottom of the basin and upon which a portion of the head that is also above the bottom of the basin is rotatively supported; and lubricant conveying means discharging lubricant from said basin upon said bearing, there being passage formation positioned to return lubricant from the bearing to the basin.

3. A windmill including a wind wheel shaft; a mill head in which said shaft is journaled and which is provided with a lubricant receiving basin; an upright shaft provided with a flange, constituting a step bearing, located above the bottom of the basin and upon which a portion of the head that is also above the bottom of the basin is rotatively supported; a power transmitting gear wheel driven by said shaft and dipping into said basin; and means for conveying lubricant from the gear wheel to said bearing.

4. A windmill including a wind wheel shaft; a mill head in which said shaft is journaled and which is provided with a lubricant receiving basin; an upright shaft provided with a step bearing, located above the bottom of the basin and upon which a portion of the head that is also above the bottom of the basin is rotatively supported; a power transmitting gear wheel driven by said shaft and dipping into said basin; and means for conveying lubricant from the gear wheel to said bearing.

5. A windmill including a wind wheel shaft; a mill head in which said shaft is journaled and which is provided with a lubricant receiving basin; an upright shaft provided with a flange, constituting a step bearing, located above the bottom of the basin and upon which a portion of the head that is also above the bottom of the basin is rotatively supported; a power transmitting gear wheel driven by said shaft and dipping into said basin; and means for conveying lubricant from the gear wheel to said bearing, there being passage formation positioned to return lubricant from the bearing to the basin.

6. A windmill including a wind wheel shaft; a mill head in which said shaft is journaled and which is provided with a lubricant receiving basin; an upright shaft provided with a step bearing, located above the bottom of the basin and upon which a portion of the head that is also above the bottom of the basis is rotatively supported; a power transmitting gear wheel driven by said shaft and dipping into said basin; and means for conveying lubricant from the gear wheel to said bearing, there being passage formation positioned to return lubricant from the bearing to the basin.

7. A windmill including the head thereof which is provided with a lubricant receiving basin; an upright shaft provided with a step bearing above and overlying the bottom of the basin and upon which a portion of the head that is also above the bottom of the basin is rotatively supported; and lubricant conveying means discharging lubricant from said basin upon said bearing.

8. A windmill including the head thereof which is provided with a lubricant receiving basin; an upright shaft provided with a step bearing upon which the head is rotatively supported, said basin having a sleeve continuation through which the shaft passes; and lubricant conveying means discharging lubricant from said basin upon said bearing, there being means for returning lubricant from said bearing to said basin, and diverting it from the interior of said sleeve continuation.

In witness whereof, I hereunto subscribe my name.

DANIEL R. SCHOLES.